US010015663B2

(12) United States Patent
Kuc

(10) Patent No.: US 10,015,663 B2
(45) Date of Patent: Jul. 3, 2018

(54) METHOD FOR ACCESSING A ROAMING DEVICE AND CORRESPONDING PROXY NETWORK

(71) Applicant: GEMALTO SA, Meudon (FR)

(72) Inventor: Jean-François Kuc, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/540,990

(22) PCT Filed: Dec. 21, 2015

(86) PCT No.: PCT/EP2015/080885
§ 371 (c)(1),
(2) Date: Jun. 29, 2017

(87) PCT Pub. No.: WO2016/107783
PCT Pub. Date: Jul. 7, 2016

(65) Prior Publication Data
US 2018/0007537 A1    Jan. 4, 2018

(30) Foreign Application Priority Data
Dec. 31, 2014    (EP) .................................... 14307220

(51) Int. Cl.
*H04W 8/12* (2009.01)
*H04W 8/02* (2009.01)
(Continued)

(52) U.S. Cl.
CPC .......... *H04W 8/12* (2013.01); *H04L 67/2861* (2013.01); *H04W 8/02* (2013.01); *H04W 8/06* (2013.01);
(Continued)

(58) Field of Classification Search
CPC .......... H04W 8/28; H04W 8/12; H04W 4/24; H04W 8/02; H04W 48/18; H04W 8/04;
(Continued)

(56) References Cited

U.S. PATENT DOCUMENTS

2007/0155382 A1* 7/2007 Jiang ...................... H04W 8/28
455/433
2016/0337845 A1* 11/2016 Noldus ................... H04W 8/06
2017/0055144 A1* 2/2017 Li .......................... H04W 4/24

FOREIGN PATENT DOCUMENTS

EP           2 725 831 A1      4/2014

OTHER PUBLICATIONS

International Search Report (PCT/ISA/210) dated Mar. 22, 2016, by the European Patent Office as the International Searching Authority for International Application No. PCT/EP2015/080885.
(Continued)

*Primary Examiner* — Nam Huynh
(74) *Attorney, Agent, or Firm* — Buchanan Ingersoll & Rooney PC

(57) ABSTRACT

A roaming device sends, through a visited network and a proxy network, to a home network, an identifier for a first subscription. The home network sends, through the proxy network, to the visited network, data relating to the first subscription. The proxy network sends to the home network a first temporary address. The visited network sends to the proxy network a second temporary address. The device activates a second subscription. The device sends, through the visited network and the proxy network, to the roaming provider network, an identifier for the second subscription. The roaming provider network sends, through the proxy network, to the visited network, data relating to the second subscription. The proxy network registers the first subscription identifier, the second subscription identifier, the first (Continued)

temporary address and the second temporary address. The proxy network sends to the roaming provider network the first temporary address.

10 Claims, 2 Drawing Sheets

(51) Int. Cl.
*H04W 8/18* (2009.01)
*H04W 8/06* (2009.01)
*H04L 29/08* (2006.01)
*H04W 48/18* (2009.01)
*H04M 15/00* (2006.01)

(52) U.S. Cl.
CPC ........ *H04W 8/183* (2013.01); *H04M 15/8038* (2013.01); *H04W 48/18* (2013.01)

(58) Field of Classification Search
CPC ....... H04W 8/06; H04W 8/205; H04W 48/16; H04W 8/183; H04W 60/005; H04W 8/18; H04W 8/20; H04W 8/26; H04W 8/082; H04M 15/8038; H04M 15/8044
See application file for complete search history.

(56) References Cited

OTHER PUBLICATIONS

Written Opinion (PCT/ISA/237) dated Mar. 22, 2016, by the European Patent Office as the International Searching Authority for International Application No. PCT/EP2015/080885.

Mobile Standards Group (MSG); *Overview of the technical framework for the separate sale of roaming services in the European Union*, Jan. 2014, pp. 1-15, ETSI TR 103 227 V1.1.1, Sophia-Antipolis Cedex, France.

Ericsson, *Completion of Proxy Function specification for VCS*, May 12-16, 2014, 3GPP TSG SA WG5 (Telecom Management) Meeting #95, Sapporo, Japan (10 pages).

\* cited by examiner

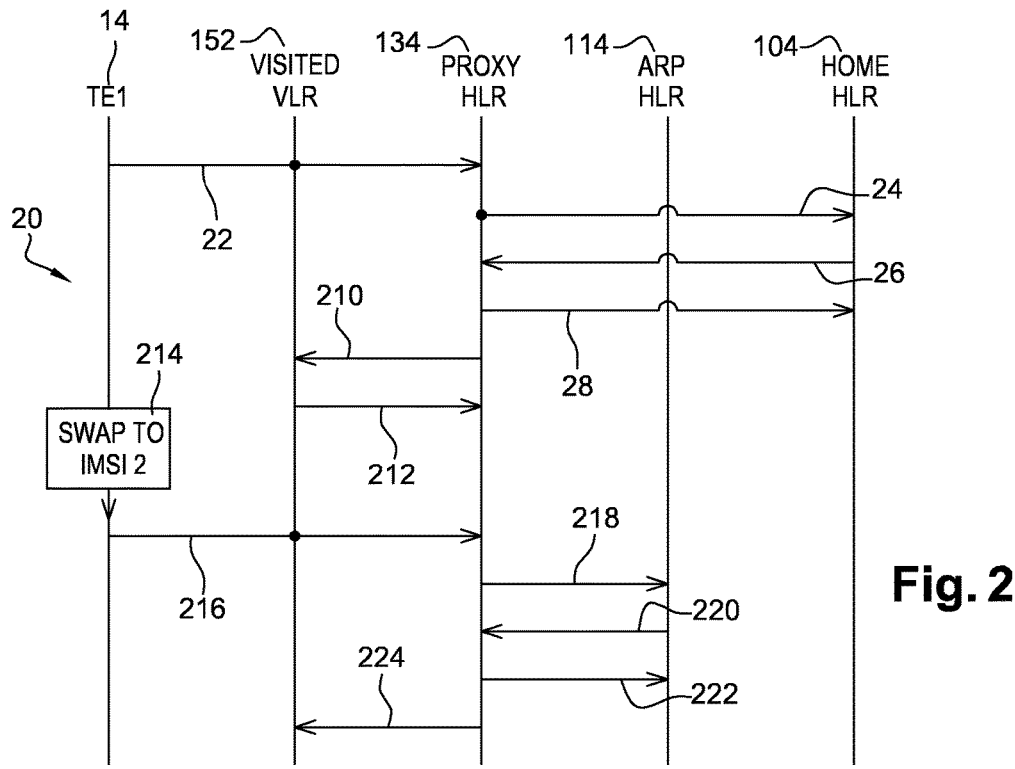
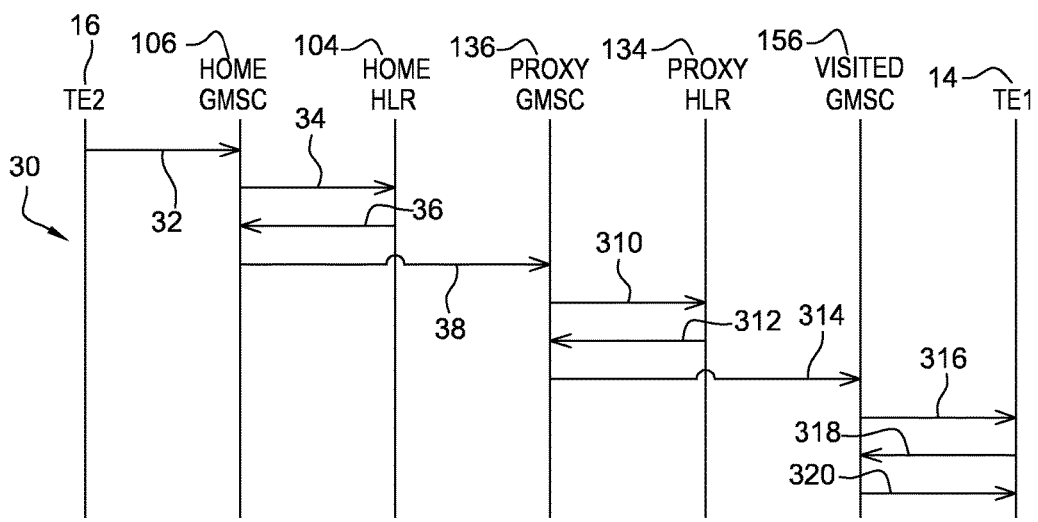
Fig. 2
Fig. 3

METHOD FOR ACCESSING A ROAMING DEVICE AND CORRESPONDING PROXY NETWORK

FIELD OF THE INVENTION

The invention relates generally to a method for accessing a roaming device.

Furthermore, the invention also pertains to a proxy network for accessing a roaming device.

The present invention is applicable to the field of telecommunications when a mobile (tele)phone, as a device, is roaming.

STATE OF THE ART

A solution termed Customized Application for the Mobile network Enhanced Logic (or CAMEL) is able to transfer a phone call to a mobile phone that is roaming. Nevertheless, the concerned end user has to pay an international incoming call each time she/he receives a Mobile Terminated Call (or MTC) while being abroad and dependent on a visited network. Such a known solution doubles the price of a voice communication while roaming.

The European Parliament and representatives of the Council and the European Commission have reached an agreement on new European Union (or EU) roaming rules, so as to reduce such a voice communication price for an end user when roaming. An end user has the option to sign up for a cheaper mobile roaming agreement by choosing, from 1 Jul. 2014, an Alternative Roaming Provider (or ARP) that is distinct from its agreement for national home mobile service while keeping her/his home call number. Such an end user benefits from lower prices on voice and Short Message Service (or SMS) services when roaming. Thus, an end user who owns a roaming device subscribes to both a home network and an ARP network.

However, only one subscription at a subscriber device is active at a given time. When a subscriber swaps from a first subscription relating to a home network to a second subscription relating to an ARP network, the subscriber is not able to be reached on her/his Mobile Station International Subscriber Directory Number (or MSISDN), as a home call number.

Thus, there is a need to reach or access a roaming device of a subscriber by using her/his home call number when the subscriber is roaming.

SUMMARY OF THE INVENTION

The invention proposes a solution for satisfying the just hereinabove specified need by providing a method for accessing a roaming device.

According to the invention, the roaming device accesses a first subscription relating to a home network. The roaming device accesses a second subscription relating to an alternative roaming provider network. The method comprises the following steps. During a registration phase, the roaming device sends, through a visited network and a proxy network, to the home network an identifier relating to the first subscription, as a first subscription identifier. The home network sends, through the proxy network, to the visited network data relating to the first subscription. The proxy network sends to the home network a first temporary address relating to the proxy network. The visited network sends to the proxy network a second temporary address relating to the visited network. The roaming device activates only the second subscription. The roaming device sends, through the visited network and the proxy network, to the alternative roaming provider network an identifier relating to the second subscription, as a second subscription identifier. The alternative roaming provider network sends, through the proxy network, to the visited network data relating to the second subscription. The proxy network registers the first subscription identifier, the associated second subscription identifier, the associated first temporary address relating to the proxy network and the associated second temporary address relating to the visited network. And the proxy network sends to the alternative roaming provider network the first temporary address relating to the proxy network.

The principle of the invention consists in that a proxy network interfaces between a visited, a home and an ARP network by getting, from a device that enters into a visited network, a first subscription identifier, sending to the home network a first temporary address and getting from the visited network a second temporary address. After a switch to a second subscription relating to the ARP network, the proxy network gets from the device a second subscription identifier and sends to the ARP network the first temporary address. The proxy network records for the roaming device the first and the second subscription identifier, the first temporary address relating to the proxy network and the second temporary address relating to the visited network. The proxy network receives from the home network data relating to the first subscription and from the ARP network data relating to the second subscription. The proxy network re-transmits to the visited network the data relating to both the first and the second subscription.

The proxy network is able to transmit to both the home and the ARP network the first temporary address relating to the proxy network and to retrieve from the visited network the second temporary address relating to the visited network.

The home network registers notably the home call number, the first subscription data and the associated first temporary address relating to the proxy network.

The ARP network registers the second subscription data and the associated first temporary address relating to the proxy network.

Two connections are maintained in parallel through the proxy network, one connection between the roaming device and the home network and another connection between the roaming device and the ARP network.

The proxy network is an intermediary network between the home and the visited network and between the visited and the ARP network.

The proxy network keeps a registration of a first temporary address relating to the proxy network and a second temporary address relating to the visited network in association with a first subscription identifier relating to the home network and a second subscription identifier relating to the ARP network.

The proxy network allows re-routing or re-directing a signaling message flow from the home network, over the proxy network, to the visited network and from the visited network, over the proxy network, to the ARP network.

The proxy network allows a real time home call number portability, so as to enable to access, in a seamless manner, a roaming device while using only its home call number without any additional roaming cost.

Such an invention method does not need to involve a roaming device user and may be thus transparent to the roaming device user.

The invention method is automatic and therefore convenient for the roaming device user.

Contrary to the aforementioned known solution, the invention method allows accessing, through the proxy network, a roaming device, as a callee (device), while keeping, transparently, its home call number to be dialed from a caller (device).

The invention method allows accessing, through the proxy network, a roaming device anywhere at any time when roaming by using only the home call number at a caller device and the first temporary address at the home and the proxy network and the second temporary address at the proxy and the visited network.

According to an additional aspect, the invention is a proxy network for accessing a roaming device.

According to the invention, during a registration phase, the proxy network is configured to receive from the roaming device, through a visited network, an identifier relating to the first subscription, as a first subscription identifier. The proxy network is configured to send to the home network the first subscription identifier. The proxy network is configured to receive from the home network data relating to the first subscription. The proxy network is configured to send to the visited network the data relating to the first subscription. The proxy network is configured to send to the home network a first temporary address relating to the proxy network. The proxy network is configured to receive from the visited network a second temporary address relating to the visited network. The proxy network is configured to receive from the roaming device, through the visited network, an identifier relating to the second subscription, as a second subscription identifier. The proxy network is configured to register the first subscription identifier, the associated second subscription identifier, the associated first temporary address relating to the proxy network and the associated second temporary address relating to the visited network. The proxy network is configured to send to the alternative roaming provider network the second subscription identifier. The proxy network is configured to receive from the alternative roaming provider network data relating to the second subscription. The proxy network is configured to send to the visited network the data relating to the second subscription. And the proxy network is configured to send to the alternative roaming provider network the first temporary address relating to the proxy network.

As a proxy network, it may include a Mobile Network Portability (or MNP) type network.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings:

FIG. 2 represents an example of a flow of messages exchanged between the terminal equipment and different entities of the visited, the proxy, the home and the ARP network of FIG. 1, in which the proxy network pushes, during a registration phase, dynamically to the home network a first temporary address and gets from the visited network a second temporary address and, after a subscription switch at the terminal equipment, the proxy network pushes dynamically to the ARP network the first temporary address; and FIG. 3 is an example of a flow of messages exchanged between a caller party, different entities of the home, the proxy and the visited network and the terminal equipment of FIG. 1, in which the caller party initiates, by using the home call number, a call establishment with the terminal equipment, as a callee party, while re-routing, through the home, the proxy and the visited network, the call establishment by using the first and the second temporary address.

DETAILED DESCRIPTION

Figure 1:
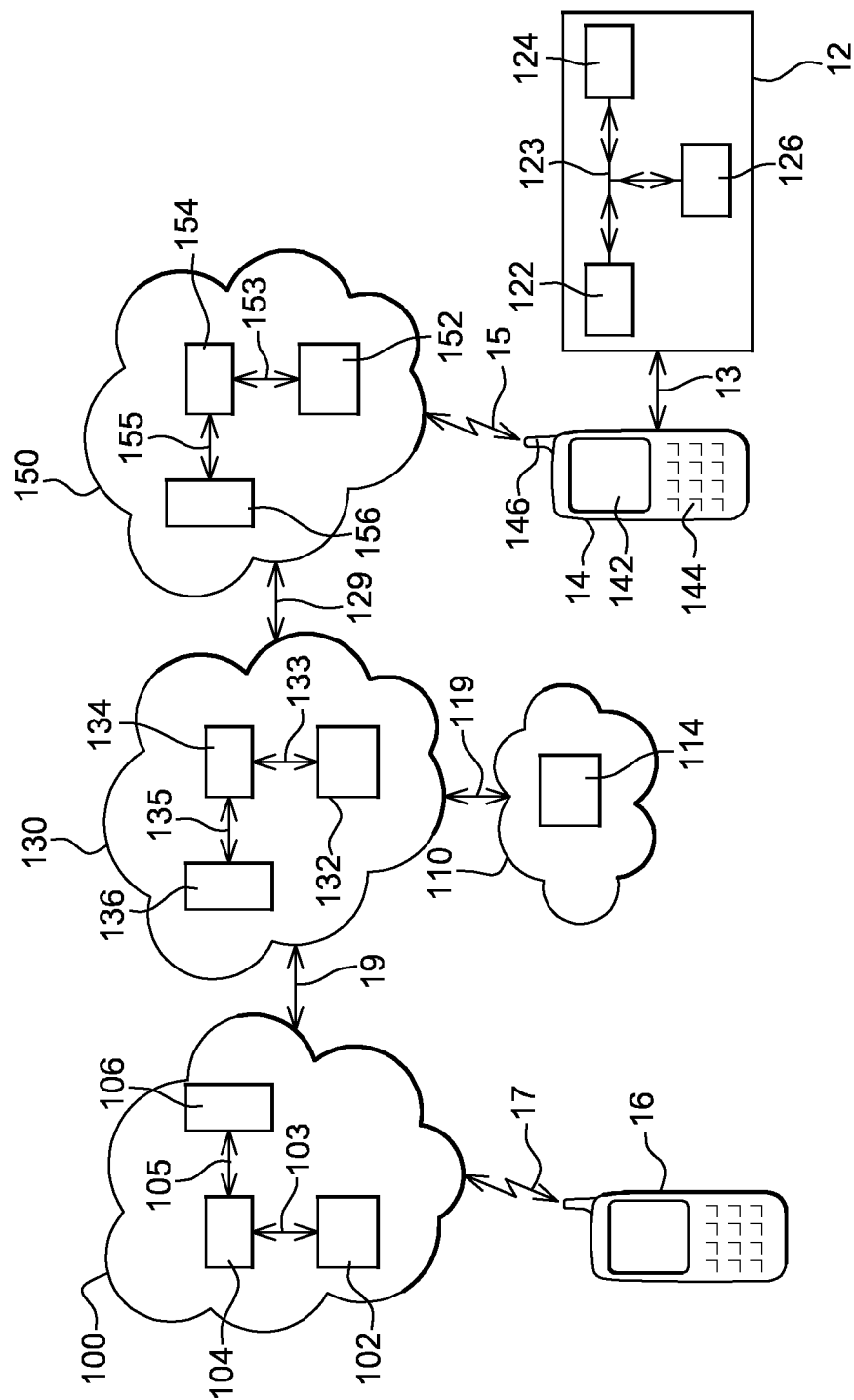
FIG. 1 illustrates a simplified diagram of a proxy network for accessing a terminal equipment, the proxy network being adapted to interface between a home, a visited and an ARP network, to provision the home and the ARP network with a temporary address relating to the proxy network, to get from the visited network a temporary address relating to the visited network, and to register, during a double network attachment, a first and a second subscription identifier and the temporary address relating to the proxy network and the temporary address relating to the visited network, according to the invention.

Herein under is considered an MNP type network, as a proxy network, for accessing a Terminal Equipment (or TE), as a roaming device, that includes a mobile phone and an embedded Universal Integrated Circuit Chip (or eUICC), as an SE for identifying and authenticating preferably the TE to both a home and an ARP network.

Within the present description, an SE is a smart electronic object that includes a chip(s) that protect(s) preferably data stored within the chip(s) and is(are) intended to communicate with the outside world, like e.g. a mobile phone, as an SE hosting device.

The SE may have different form factors.

Instead of being soldered, possibly in a removable manner, onto a Printed Circuit Board (or PCB) of an SE host device, the SE may be, for instance, carried by a smart card or a dongle of the Universal Serial Bus (or USB) type.

Naturally, the herein below described embodiment is only for exemplifying purposes and is not considered to reduce the scope of the present invention.

FIG. 1 shows schematically a mobile phone 14, as a roaming device, that is connected to a home network 100 and an ARP network 110, through an MNP network 130 and a visited network 150.

Only one phone 14, as a mobile TE and TE1, is represented for clarity reason. However, several TEs have each their home call number and are managed by the MNP network 130, as a proxy network. Accordingly, the TEs keep each their home call number when roaming and are each able to be reached in a visited country, through the proxy network, with their home call number.

The phone 14 includes an incorporated chip 12 that is soldered on a PCB of the phone 14.

The phone 14 is preferably able to interact with the chip 12, so as to identify and authenticate, in particular, to the home network 100 and the ARP network 110.

Alternately, instead of embedding the chip 12, the phone 14 stores, within its own memory (not represented), data stored within the chip 12 as described infra.

The chip 12 belongs to a phone user, as a subscriber to the home network 100 and a subscriber to the ARP network 110.

The chip 12 includes one (or several) microprocessor(s) 122, as data processing means, one (or several) memory(ies) 124, as data storing means, and one (or several) Input/Output (or I/O) interface(s) 126 that are internally all connected, through an internal bidirectional data bus 123, to each other.

The I/O interface(s) 126 allow(s) communicating data from the internal chip components to the chip exterior and conversely.

The microprocessor(s) 122 process(es), control(s) and communicate(s) internally data with all the other components incorporated within the chip 12 and, through the I/O interface(s) 126, with the chip exterior.

The (or each) microprocessor 122 executes an Operating System (or OS) and one or several applications.

The microprocessor 122 executes, in a preferred manner, one or several security applications.

The security applications include preferably a user authentication process to be used prior to accessing the memory 124. To authenticate successfully the user, the user has to provide a Personal Identity Number (or PIN), biometric data and/or the like, as user reference authentication data that is securely stored within the memory 124, that has to match the user reference authentication data.

The microprocessor 122 is preferably able to initiate actions, in order to interact directly with the outside world, in an independent manner of the chip hosting device. Such a capacity of interaction at the initiative of the chip 12 is also known as a proactive capacity. The chip 12 plays thus a role of a master while the chip hosting device plays a role of a slave.

The chip 12 is thus able to send, at its own initiative, through the phone 14, to any device connected to the phone 14, a proactive command for sending, for instance, to the home network 100 (or the ARP network 110) data for triggering an authentication mechanism, so as to be authenticated to the home network 100 (or the ARP network 110 respectively).

The memory 124 stores data relating to one or several wireless services.

The memory 124 stores, preferably in a secure manner, a set of data relating to each subscription among a plurality of subscriptions to (mobile radio-communication) networks 100, 110 and 130.

Each set of data, as wireless service data, relating to one subscription to one network includes:
- an International Mobile Subscriber Identity (or IMSI), as a subscriber and a service subscription identifier for accessing a network;
- a key Ki, as an authentication key, allowing to authenticate the concerned subscriber to the concerned network;
- Milenage, as an authentication algorithm, allowing to authenticate the concerned subscriber to the concerned network;
- one or several passwords, like e.g. a PIN, biometric data and/or one or several cryptographic algorithm(s), as data relating to secret(s);
- a file system including one or several Elementary Files (or EF);
- one or several security keys, like e.g. a key(s) for encrypting/decrypting data and/or a key(s) for signing data a key(s);
- one or several applicative keys, like e.g. a key for accessing a user bank account through the mobile radio-communication network; and/or
- one or several credentials, like e.g. a user name and/or an IDentifier (or ID) of the subscriber, as data relating to the user.

As known per se, the IMSI includes the following data fields, a Mobile Country Code (or MCC) in combination with a Mobile Network Code (or MNC) to uniquely identify a mobile device operator, as routing data for routing to the concerned network.

For sake of simplicity, the memory 124 stores, for instance, only two sets of subscription data, a first set of data, as a home profile, relating to a first subscription, as IMSI1, and a second set of data, as an ARP profile, relating to a second subscription, as IMSI2. However, the memory 124 may store more than two sets of subscription data and the invention is still applicable.

The first subscription IMSI1 is chosen such that its routing data re-directs or re-routes, through the proxy network 130, to the home network 100.

The second subscription IMSI2 is chosen such that its routing data re-directs or re-routes, through the proxy network 130, to the ARP network 110.

Two subscriptions IMSI1 and IMSI2 to, firstly, the proxy network 130 and the home network 100, and, secondly, the proxy network 130 and the ARP network 110, are available, at the phone 14 side, namely within the chip 12 (or the phone 14).

The memory 124 has been pre-provisioned, during its manufacturing and/or after its issuance, with the home profile and the ARP profile.

The memory 124 stores, preferably within a first security domain (not represented), as a first memory area, the first set of data, as the home profile, relating to the first subscription IMSI1.

The first subscription data set allows accessing from the phone 14, through the visited network 150 and the proxy network 130, to a Home Location Register (or HLR) type entity, as a home server 104, included within the home network 100.

The first subscription IMSI1 is active, i.e. is in an enabled state, before a subscription switch, at the phone 14 side.

The first subscription data comprises an identifier IMSI1 relating to the first subscription.

The first subscription data includes preferably a first key Ki1, as a first authentication key Ki1, for authenticating the subscriber to the home network 100. The first authentication key Ki1 is related to the first subscription IMSI1. The first authentication key Ki1 allows authenticating the subscriber to the home network 100, and, more exactly, the home server 104.

The memory 124 also stores, preferably within a second security domain (not represented), as a second memory area, the second set of data, as the ARP profile, relating to a second subscription IMSI2.

The second subscription data set allows accessing from the phone 14, through the visited network 150 and the proxy network 130, to an ARP HLR type entity, as an ARP HLR or ARP server 114, that is included within the ARP network 110.

The ARP network 110 is preferably distinct from the home network 100.

Alternatively (not represented), the ARP network is at least a part of the home network.

The second subscription IMSI2 is non-active, i.e. is in a disabled state, before the subscription switch, at the phone 14 side.

The second subscription data comprises an identifier IMSI2 relating to a second subscription.

The second subscription data includes preferably a second key Ki2, as a second authentication key Ki2, for authenticating the subscriber to the ARP network 110. The second authentication key Ki2 is related to the second subscription IMSI2. The second authentication key Ki2 allows authenticating the subscriber to the ARP network 110, and, more exactly, the ARP HLR 114.

A particular subscription may be identified by one or several identifiers, like e.g. a subscriber identifier IMSI, an identifier relating to an application, also termed Application IDentifier (or AID), a Security Domain Subscription Issuer (or SDSI) and/or an identifier(s) relating to any software or hardware entity(ies) that is(are) involved within a communication path to access the concerned subscription (data).

The memory 124 stores preferably one or several Subscriber Identity Module (or SIM) type applications.

The SIM type application(s) includes, among others, a SIM application for a Global System for Mobile communication (or GSM) type network, a Universal Subscriber Identity Module (or USIM) application for a Universal Mobile Telecommunications System (or UMTS) type network, a Code Division Multiple Access (or CDMA) Subscriber Identity Module (or CSIM) application and/or an Internet protocol Multimedia Subsystem (or IMS) Subscriber Identity Module (or ISIM) application.

The SIM type application(s) allow(s) the token hosting device, like the phone 14, to authenticate to the first network(s) 100 by using the first credentials IMSI1/Ki1.

The microprocessor 122 executes a subscription manager.

The subscription manager carries out a subscription switch, namely a switch from the first subscription IMSI1 to the second subscription IMSI2, as a unique subscription that is active after the subscription switch.

The subscription manager is able to send, through the phone 14 (OS), to the visited network 150, a request for accessing the home network 100 by using the first subscription IMSI1.

The subscription manager is preferably able to receive from the home network 100, an authentication success message, as request response, by using the first subscription IMSI1 and the first authentication key Ki1.

The subscription manager is able to de-activate the first subscription IMSI1 and then to activate the second subscription IMSI2.

The subscription manager is able to send, through the phone 14 (OS), to the visited network 150, after the subscription switch, a request for accessing the ARP network 110, by using the second subscription IMSI2.

The subscription manager is preferably able to receive from the ARP network 110, an authentication success message, as request response, by using the second subscription IMSI2 and the second authentication key Ki2.

The chip 12 is connected, through a bi-directional link 13, to the phone 14.

Instead of a phone, it may be any other device including means for processing data, comprising or being connected to at least one I/O interface with the chip 12, comprising or being connected to one or several wireless I/O interfaces, as communication means for exchanging wirelessly data with outside, and comprising or being connected to means for storing data.

Instead of being constituted by a phone, the chip hosting device may be, for instance, a vehicle, as a machine (in a Machine To Machine (or M2M) environment), a laptop computer, a Personal Computer (or PC), a tablet computer, a media-player, a game console, a netbook, a handset, a Personal Digital Assistance (or PDA), any other portable device or other device that accesses an RF interface(s) for exchanging with a mobile network(s).

Such a chip hosting device list is not exhaustive but only for exemplifying purposes.

The phone 14, as TE1, is used for accessing several mobile networks 100, 110, 130 and 150.

The phone 14 includes preferably a display screen 142 and a keyboard 144, as Man Machine Interface (or MMI).

The MMI allows a phone user to interact with the phone 14.

The phone 14 comprises an antenna 146. The antenna 146 allows communicating data, through a Long Range (or LR) Radio-Frequency (or RF) link(s) 15, with the visited network 100.

The phone 14 includes data processing means, such as one or several microprocessor(s) (not represented), data storing means (not represented), like phone memory(ies), and at least three I/O interfaces (not represented).

The phone 14 plays, in a preferential manner, a role of a modulator-demodulator (or modem), so as to exchange data, through the visited network 150 and the proxy network 130, between the chip 12 and either the home network 100 or the ARP network 110.

The home network 100 is connected, through a first bi-directional link 19, to the MNP network 130.

The home network 100 includes a Visitor Location Register (or VLR) type entity, as a home VLR 102.

The home VLR 102 may be integrated within or connected to a so-termed Mobile Switching Center (or MSC) (not represented) that is included within the home network 100.

The home VLR 102 is a database that includes a set of data relating to home subscribers, like e.g. the phone 14 user.

The home VLR 102 is able to provide data relating to a home subscriber.

Data stored within the home VLR 102 database originates from either the home HLR 104 or from a device, like e.g. a second phone 16, as a second Terminal Equipment or TE2, that is covered by the home VLR 102.

The home VLR 102 stores an IMSI relating to the concerned TE2, as an identity number of the concerned subscriber, the associated TE2 MSISDN, as a phone number of the concerned subscriber and an address of the home HLR relating to the TE2 (of the concerned subscriber).

The home VLR 102 is connected, through a first internal bi-directional link 103, to the home HLR 104.

The home VLR 102 is able to provide a Visited (or V) MSC (not represented) relating to the visited network 150 with required data for a call set-up or establishment and preferably for an authentication of a subscriber device, like e.g. the phone 14.

The home HLR 104 is included within the home network 100.

The home HLR 104 records data, as first subscription data, relating to the phone 14 user, as a home subscriber. The first subscription data includes a first subscription identifier IMSI1 and an associated MSISDN, as a phone number and a home call number, that is to be used for accessing a home subscriber device, like e.g. the TE1, during a call establishment. The IMSI1 and the MSISDN form a pair IMSI1/MSISDN relating to the phone 14 user, as a subscriber to the home network 100.

As first subscription data, it includes preferably information relating to a location of the home subscriber, as the phone 14 user, like e.g. LOCation Information (or LOCI), an identifier relating to a cell or a geographical location.

A first authentication key Ki1, as a first authentication key for authenticating to the home network 100 and first subscription data, is recorded, at the home HLR 104, within an associated home AUthentication Center (or AUC) (not represented), as a central database. The first authentication key Ki1 relates to the first subscription IMSI1. The first authentication key Ki1 is to be used by the chip 12 to authenticate to the home network 100, and, more exactly, the home HLR 104.

The home network 100 includes a Gateway Mobile Switching Center (or GMSC) type entity, as a home GMSC 106.

The home GMSC 106 is connected, through a second internal bi-directional link 105, to the home HLR 104.

The home GMSC 106 is the MSC that determines which V-MSC the home subscriber who is being called is currently located at. A mobile call is routed through the home GMSC 106.

The ARP network 110 is connected, through a second bi-directional link 119, to the MNP network 130.

The ARP network 110 includes an ARP HLR type entity, as an ARP HLR 114.

The ARP HLR 114 records, after an initial registration phase, data, as second subscription data, relating to the phone 14 user, as an ARP subscriber. The second subscription data includes a second subscription identifier IMSI2 and an associated Mobile Station Roaming Number (or MSRN) relating to the proxy network 130 and to be received from the proxy network 130. The MSRN relating to the proxy network 130 is to be allocated by the proxy network 130, as a temporary address relating to the proxy network 130. The MSRN relating to the proxy network 130 includes an address relating to a GMSC type entity relating to the proxy network 130. The MSRN relating to the proxy network 130 is to be used for routing a call in a mobile call from a GMSC to the GMSC type entity relating to the proxy network 130, as the target MSC.

As second subscription data, it includes preferably information relating to a location of the home subscriber, as the phone 14 user, like e.g. LOCI, an identifier relating to a cell or a geographical location.

A second authentication key Ki2, as a second authentication key for authenticating to the ARP network 110 and second subscription data, is recorded, at the ARP HLR 114, within an associated ARP AUC (not represented), as a central database. The second authentication key Ki2 relates to the second subscription IMSI2. The second authentication key Ki2 is to be used by the chip 12 to authenticate to the ARP network 110, and, more exactly, the ARP HLR 114.

The phone 14 is connected, through a bi-directional Long Range (or LR) Radio-Frequency (or RF) link(s) 15, via a Base Transceiver Station (or BTS) (not represented) relating to the visited network 150 or the like, to the visited network 150.

The LR RF(s) may be fixed at several hundreds of MHz, for instance, around 850, 900, 1800, 1900 and/or 2100 MHz.

The phone 14 is under a radio coverage of the concerned BTS type entity relating to the visited network 150.

The visited network 150 is constituted by a mobile radio-communication network(s), like e.g. a Global System for Mobile communication (or GSM), a General Packet Radio Service (or GPRS), a Universal Mobile Telecommunications System (or UMTS), a UTRAN (acronym for "UMTS Terrestrial Radio Access Network"), an EDGE (acronym for "Enhanced Data Rates for GSM Evolution"), a (Wideband) Code Division Multiple Access (or (W-)CDMA) type network(s), a Third Generation Partnership Project (or 3GPP) and/or a fourth Generation (or 4G) radio-communication type technology(ies).

Such a mobile radio-communication network list is not exhaustive but only for exemplifying purposes.

The visited network BTS is connected to a VLR type entity, as a Visited (or V-) VLR 152. The V-VLR 152 may be integrated within or connected to a so-termed Visited Mobile Switching Center (or V-MSC) (not represented) that is included within the visited network 150.

The V-MSC is the MSC which manages a phone 14 user, as a home network 100 subscriber, who is currently situated within a covered location area that is served by the V-MSC.

The V-VLR 152 is a database of each subscriber who has roamed into a location area that is managed by the V-MSC and that the V-MSC serves.

The V-MSC is in charge of routing voice calls and SMS type messages. The V-MSC sets up an end-to-end connection.

The V-VLR 152 associated with the V-MSC gets data relating to a subscriber of the roaming device, like e.g. the phone 14.

Data stored in the V-VLR 152 database originates from either the home HLR 104, as the HLR type entity relating to the home network 100 of the roaming device, or the roaming device itself.

The V-VLR 152 is connected, through a first internal bi-directional link 153, to a HLR type entity, as a V-HLR 154.

The V-HLR 154 is included within the visited network 150.

When the V-MSC detects a roaming device within a location (or serving) area that the V-MSC manages, the V-MSC requests the V-VLR 152 to generate a record and updates an HLR type entity relating to the proxy network 130 of the roaming device by providing it with a roaming device location.

The V-VLR 152 is able to generate, for the concerned roaming device, upon an initial registration, a Mobile Station Roaming Number (or MSRN) relating to the visited network 150, as a temporary address relating to the visited network 150. The MSRN relating to the visited network 150 is a phone number that is used for routing a phone call in a mobile network, like e.g. the proxy network 130, from a GMSC to a target GMSC 156 included within the visited network 150. The MSRN relating to the visited network 150 is temporarily assigned or allocated to a roaming device which roams into a location area that is served by the concerned V-MSC for a MTC. The MSRN relating to the visited network 150 is preferably assigned for every MTC. The MSRN relating to the visited network 150 includes a current Visitor Country Code (or VCC), a Visitor National Destination Code (or VNDC), an identification of the current V-MSC and a subscription identifier, like e.g. the first subscription identifier IMSI1 relating to the home network 100.

The V-VLR 152 stores the concerned subscription identifier, like e.g. the first subscription identifier IMSI1 relating to the proxy network 130 and the home network 100, the associated MSRN relating to the visited network 150, as a phone number of the concerned subscriber and an address of an HLR type entity relating to the proxy network 130 (of the concerned subscriber).

The V-VLR 152 is connected, through a first internal bi-directional link 153, to a V-HLR type entity relating to the visited network 150, as a V-HLR 154.

The V-VLR 152 informs, through the HLR type entity relating to the proxy network 130, the home HLR 104 that a subscriber to the home 100 and proxy 130 networks is present or has arrived in a particular identified (location) area that is covered by the V-VLR 152.

The V-VLR 152 requests, through the HLR type entity relating to the proxy network 130, to the home HLR 104, data relating to the subscriber of the roaming device that is attached to its serving area.

The V-VLR 152 provides the V-MSC with required data for a call set-up or establishment and preferably for an authentication of the roaming device.

The visited network 150 includes a GMSC type entity, as a V-GMSC 156.

The V-GMSC 156 is connected, through a second internal bi-directional link 155, to the V-HLR 154.

The V-GMSC 156 is the MSC that determines which V-MSC the subscriber who is being called is currently located at. A (mobile) call is routed through the V-GMSC 156.

The V-GMSC 156 may be the V-MSC.

The visited network 150 is connected, through a third bi-directional link 129, to the MNP network 130.

The MNP network 130 constitutes a proxy network.

The proxy network 130 includes a VLR type entity, as a proxy VLR 132.

Data stored within the proxy-VLR 132 database originates from the V-VLR 152, the home HLR 104 or the ARP HLR 114 for the roaming device.

The proxy VLR 132 is able to generate, for the concerned roaming device, upon an initial registration, an MSRN relating to the proxy network 130, as a temporary address relating to the proxy network 130.

The MSRN relating to the proxy network 130 is temporarily assigned or allocated to a roaming device which roams into a location area that is served by the concerned V-MSC for a MTC.

The MSRN relating to the proxy network 130 is preferably assigned for every MTC The MSRN relating to the proxy network 130 includes a current VCC, a VNDC, an identification of the current V-MSC and a subscription identifier, like e.g. the first subscription identifier IMSI1 relating to the home network 100 or the second subscription identifier IMSI2 relating to the ARP network 110 after the subscription switch at the phone 14.

According to an essential feature of the invention, the proxy VLR 132 stores, after an initial registration phase, the concerned subscription identifiers, like e.g. the first subscription identifier IMSI1 relating to the proxy network 130 and the home network 100 and the second subscription identifier IMSI2 relating to the proxy network 130 and the ARP network 110, an associated temporary address relating to the proxy network 130 and an associated temporary address relating to the visited network 150.

The proxy VLR 132 is connected, through a first internal bi-directional link 133, to an HLR type entity, as a proxy HLR 134.

The proxy HLR 134 is included within the proxy network 130.

The proxy HLR 134 is a central database that includes data relating to each MNP (or proxy) subscriber, like e.g. the phone 14 user, that is authorized to use the proxy network 130.

The proxy HLR 134 manages, within the central database, a correspondence table that associates, on the hand, a subscription identifier with an HLR type entity relating to the corresponding home network and, on the other hand, a subscription identifier with an HLR type entity relating to the corresponding ARP network.

The central database stores, after a double network attachment and a registration phase, for each MNP subscriber relating to a roaming device, like e.g. the phone 14, the first subscription IMSI1 relating to the home network 100, the second subscription IMSI2 relating to the ARP network 110, an associated temporary address relating to the proxy network 130 and an associated temporary address relating to the visited network 150.

The proxy HLR 134 informs the home HLR 104 that a subscriber to the home 100 and proxy 130 networks is present or has arrived in a particular identified (location) area that is covered by the V-VLR 152.

The proxy HLR 134 requests to the home HLR 104 data relating to the first subscription of the roaming device and provides it to the V-VLR 152.

According to an essential feature of the invention, the proxy-HLR 134 is configured to provide the home HLR 104 with the temporary address relating to the proxy network 130 that is associated with the first subscription IMSI1.

According to an essential feature of the invention, the proxy-HLR 134 is configured to receive from the V-VLR 152 the temporary address relating to the visited network 150 that is associated with the first subscription IMSI1.

The proxy HLR 134 informs, after the subscription switch at the roaming device, the ARP HLR 114 that a subscriber to the ARP 110 and proxy 130 networks is present or has arrived in a particular identified (location) area that is covered by the V-VLR 152.

The proxy HLR 134 requests to the ARP HLR 114 data relating to the second subscription of the roaming device and provides it to the V-VLR 152.

According to an essential feature of the invention, the proxy-HLR 134 is configured to provide the ARP HLR 114 with the temporary address relating to the proxy network 130 that is associated with the second subscription IMSI2.

The proxy network 130 includes a GMSC type entity, as a proxy GMSC 136.

The proxy GMSC 136 is connected, through a second internal bi-directional link 135, to the proxy HLR 134.

The proxy GMSC 136 is the MSC that determines which V-MSC the proxy subscriber who is being called is currently located at. A (mobile) call is routed through the proxy GMSC 136.

The proxy network 130 is, on the one hand, an intermediary network between the visited network 150 and the home network 100, and, on the other hand, after a subscription switch, an intermediary network between the visited network 150 and the ARP network 110.

The proxy network is operated by a Mobile Network Operator (or MNO), a Mobile Virtual Network Operator (or MVNO), a Mobile Virtual Network Enabler (or MVNE) and/or on its(their) behalf.

FIG. 2 depicts, upon a registration phase, an example of a message flow 20 that involves notably the phone 14, as a TE1, the V-VLR 152, the proxy HLR 134, the home HLR 104 and the ARP HLR 114.

It is assumed that the phone 14 is present within a country that is covered by the visited network 150 and that is not covered by the home network 100.

It is also assumed that the chip 12 with the first IMSI1 and the second IMSI2 subscription is linked, through the two subscriptions IMSI1 and IMSI2, to the proxy HLR 134 that acts like a server that re-directs a signalling flow between the V-VLR 152 and either the home HLR 104 or the ARP HLR 114.

It is further assumed that all the different network entities exchange by using a Mobile Application Part (or MAP) type protocol.

However, the different network entities may use any other data communication protocol(s) and the invention method is still applicable.

The phone 14 is powered on.

The chip 12 is configured with the home profile that is associated with a proxy network 130 IMSI, as being active.

Firstly, the phone 14 sends a message 22 including an Update Location (or UL) request that comprises the first subscription IMSI1, so as to request to attach to a mobile home network.

The V-MSC detects that the phone 14, as a roaming device, is present within a particular Location Area (or LA) under a radio-coverage of the visited network 150.

The LA is uniquely identified within the visited network 150 by its Location Area Code (or LAC) that is comprised within LOCation Information (or LOCI), as a first phone 14 location.

The V-MSC requests the V-VLR 152 to generate a record relating to the phone 14.

The V-VLR 152 identifies the proxy HLR 134 of the phone 14 by using the received first subscription IMSI1.

The V-VLR 152 receives and forwards to the proxy HLR 134 the message 22 including the UL request that comprises the first subscription IMSI1 by adding the LOCI1, as the first phone 14 location.

The proxy network 130 is seen from the V-VLR 152, as an HLR type entity.

The proxy HLR 134 queries its central database, so as to retrieve the home HLR 104 that is associated with the first subscription IMSI1.

Once the home HLR 104 is identified, the proxy HLR 134 sends to the home HLR 104 a message 24 including the UL request, the first subscription IMSI1 and the first phone 14 location.

The proxy network 130 is seen from the home HLR 104, as a VLR type entity.

The home HLR 104 registers the first phone 14 location in association with the first subscription identifier IMSI1.

The home HLR 104 thus tracks a location in which the subscriber is currently present.

The home HLR 104 authenticates preferably the phone 14 by sending to the phone 14/chip 12 a challenge (not represented).

If the chip 12 fails to authenticate to the home HLR 104, then the home HLR 104 does not continue to exchange with the phone 14.

Otherwise, i.e. when the chip 12 succeeds in authenticating to the home HLR 104 by using the first authentication key Ki1 (that is shared with the home HLR 104) and sending an expected result (not represented) depending on the challenge and Kit, preferably after having received a Send Routing Info (or SRI), as a V-VLR 152 request (not represented), the home HLR 104 sends to the proxy HLR 134 a message 26 including Insert Subscriber Data (or ISD), as ISD1 and data relating to the first subscription IMSI1 and to the phone 14 subscriber, and a request for getting an MSRN relating to the proxy VLR 132, as a first temporary address relating to the proxy network 130.

The proxy HLR 134 requests the proxy VLR 132 to generate a record relating to the phone 14.

The proxy VLR 132 generates the MSRN relating to the proxy VLR 132.

Once the first temporary address relating to the proxy network 130 is generated and retrieved from the proxy VLR 132, the proxy HLR 134 sends to the home HLR 104 a message 28 including the first temporary address relating to the proxy network 130.

The proxy HLR 134 does not send to the home HLR 104 any Signalling System N°7 (or SS7) cancel type message.

Accordingly, the proxy HLR 134 maintains open the connection to the home HLR 104.

The proxy HLR 134 sends to the V-VLR 152 a message 210 including the ISD1, as the data relating to the first subscription IMSI1, and a request for getting an MSRN relating to the V-VLR 152, as a second temporary address relating to the visited network 150.

The V-VLR 152 generates the MSRN relating to the V-VLR 152.

Once the second temporary address relating to the visited network 150 is generated, the V-VLR 152 sends to the proxy HLR 134 a message 212 including the second temporary address relating to the visited network 150.

The proxy HLR 134 registers, for the phone 14 subscriber, the first subscription IMSI1, the first temporary address relating to the proxy network 130 and the second temporary address relating to the visited network 150, as associated data.

The chip 12 has detected to be in roaming by a message (not represented) including the LOCI1, as the first phone 14 location that is dependent on an ARP profile.

The chip 12 then switches 214 to the ARP profile that is associated with a proxy network IMSI.

The first subscription IMSI1 is therefore de-activated and the second subscription IMSI2 is activated.

After the subscription switch or swap, the phone 14 sends a message 216 including an UL request that comprises the second subscription IMSI2, so as to request to attach to an ARP network.

The V-MSC detects that the phone 14, as a roaming device, is present within a particular LA under a radio-coverage of the visited network 150.

The LA is uniquely identified within the visited network 150 by its LAC that is comprised within LOCI2, as a second phone 14 location.

The LOCI2, as the second phone 14 location, may be distinct from or equal to the LOCI1, as the first phone 14 location.

The V-MSC requests the V-VLR 152 to generate a record relating to the phone 14.

The V-VLR 152 identifies the ARP HLR 114 of the phone 14 by using the received second subscription IMSI2.

The V-VLR 152 receives and forwards to the ARP HLR 114 the message 216 including the UL request that comprises the second subscription IMSI2 by adding the LOCI2, as the second phone 14 location.

The proxy network 130 is still seen from the V-VLR 152, as an HLR type entity.

The proxy HLR 134 queries its central database, so as to retrieve the ARP HLR 114 that is associated with the second subscription IMSI2.

Once the ARP HLR 114 is identified, the proxy HLR 134 sends to the ARP HLR 114 a message 218 including the UL request, the second subscription IMSI2 and the second phone 14 location.

The ARP HLR 114 registers the second phone 14 location in association with the second subscription identifier IMSI2.

The home HLR 104 thus tracks a location in which the subscriber is present.

The proxy network 130 is seen from the ARP HLR 114, as a VLR type entity.

The ARP HLR 114 authenticates preferably the phone 14 by sending to the phone 14/chip 12 a challenge (not represented).

If the chip 12 fails to authenticate to the ARP HLR 114, then the ARP HLR 114 does not continue to exchange with the phone 14.

Otherwise, i.e. when the chip 12 succeeds in authenticating to the ARP HLR 114 by using the second authentication key Ki2 (that is shared with the ARP HLR 114) and sending an expected result (not represented) depending on the challenge and Ki2, preferably after having received an SRI2, as a V-VLR 152 request (not represented), the ARP HLR 114 sends to the proxy HLR 134 a message 220 including ISD2, as data relating to the second subscription IMSI2 and to the phone 14 subscriber, and a request for getting an MSRN relating to the proxy VLR 132, as the first temporary address relating to the proxy network 130.

Once the first temporary address relating to the proxy network 130 is generated and retrieved from the proxy VLR 132, the proxy HLR 134 sends to the ARP HLR 114 a message 222 including the first temporary address relating to the proxy network 130.

Since the proxy HLR 134 has not sent to the ARP HLR 104 any SS7 cancel type message, the proxy HLR 134 maintains, in parallel, open two connections, namely a first connection to the home HLR 104 and a second connection to the ARP HLR 114.

The proxy HLR 134 sends to the V-VLR 152 a message 224 including the ISD2, as the data relating to the second subscription IMSI2, and preferably a request for getting an MSRN relating to the V-VLR 152, as a second temporary address relating to the visited network 150.

The V-VLR 152 generates the MSRN relating to the V-VLR 152.

Once the second temporary address relating to the visited network 150 is generated, the V-VLR 152 sends to the proxy HLR 134 a message (not represented) including the second temporary address relating to the visited network 150.

During the registration phase, the proxy HLR 134 registers, for the phone 14 subscriber, the MSISDN, the first subscription IMSI1, the second subscription IMSI2, the first temporary address relating to the proxy network 130 and the second temporary address relating to the visited network 150, as associated data.

During the registration phase, the home HLR 104 registers, for the phone 14 subscriber, the first subscription IMSI1, the first phone 14 location and the first temporary address relating to the proxy network 130, as associated data that is provided or communicated by the proxy HLR 34.

During the registration phase, the ARP HLR 114 registers, for the phone 14 subscriber, the second subscription IMSI2, the second phone 14 location and the first temporary address relating to the proxy network 130, as associated data that is provided or communicated by the proxy HLR 34.

FIG. 3 shows, upon a call establishment, an example of a message flow 30 that involves notably the phone 16, the home GMSC 106, the home HLR 104, the proxy GMSC 136, the proxy HLR 134, the visited GMSC 156 and the phone 14.

Firstly, the phone 16, as the TE2 and a caller party, initiates a call establishment by using the MSISDN, as the home call number relating to the phone 14.

The TE2 sends to the home GMSC 106 a call request 32 including the MSISDN.

Once the call request is received, the home GMSC 106 sends to the home HLR 104 a request 34 for getting a first temporary address relating to the proxy network 130 that is associated with the MSISDN.

The home HLR 104 queries its central database by using the received MSISDN, so as to know where the phone 14 is located and to get the associated MSRN relating to the proxy VLR 132, as the first temporary address relating to the proxy network 130.

The MSRN relating to the proxy VLR 132 (or the proxy GMSC 136) allows routing a phone call from the home GMSC 106 to the proxy GMSC 136, as the target GMSC.

Once the home HLR 104 knows that the phone 14 is registered at the proxy network 130 and has retrieved the first temporary address relating to the proxy network 130, the home HLR 104 sends to the home GMSC 106 a request response 36 including the first temporary address relating to the proxy network 130.

Once the home GMSC 106 has received the MSRN relating to the proxy VLR 132, the home GMSC 106 sends to the proxy GMSC 136 a call request 38 including the first temporary address relating to the proxy network 130.

Once the call request is received, the proxy GMSC 136 sends to the proxy HLR 134 a request 310 for getting a second temporary address relating to the visited network 150 that is associated with the first temporary address relating to the proxy network 130.

The proxy HLR 134 queries its central database by using the received first temporary address relating to the proxy network 130, so as to know where the phone 14 is located and to get the associated MSRN relating to the V-VLR 152, as the second temporary address relating to the visited network 150.

The MSRN relating to the V-VLR 152 (or the visited GMSC 156) allows routing a phone call from the proxy GMSC 136 to the visited GMSC 156, as the target GMSC.

Once the proxy HLR 134 knows that the phone 14 is registered at the visited network 150 and has retrieved the second temporary address relating to the visited network 150, the proxy HLR 134 sends to the proxy GMSC 136 a request response 312 including the second temporary address relating to the visited network 150.

Once the proxy GMSC 136 has received the second temporary address relating to the visited network 150, the proxy GMSC 136 sends to the visited GMSC 156 a call request 314 including the second temporary address relating to the visited network 150.

Then, the visited GMSC 156 terminates successfully the call establishment with the phone 14.

To terminate the call establishment, the visited GMSC 156 sends to the TE1 14 a paging request 316.

The TE1 14 sends back to the visited GMSC 156 a corresponding paging response 318.

Finally, the visited GMSC 156 sends back to the TE1 14 a corresponding success message 320 meaning that the call is established.

During the call establishment phase, the proxy GMSC 136 communicates with the home GMSC 106 and the visited GMSC 156.

The invention method allows ensuring a real time mobile portability relating to a roaming device by using the proxy network 130, as an intermediary network between the home 100, the ARP 110 and the visited 150 network.

The roaming device is thus able to reached, in a seamless manner, anywhere at any time when roaming by using the home call number and the first temporary address relating to the proxy network 130 and the second temporary address relating to the visited network 150.

The invention method is fully transparent to the caller party and the roaming device, as the called party. In other words, the caller and callee party are both not aware of the use of the first temporary address relating to the proxy network 130 and the second temporary address relating to the visited network 150 that are used at the network side.

The invention method is therefore user friendly.

A lot of amendments of the embodiment described supra may be brought without departing from the scope of the invention. For example, as another embodiment, instead of being implemented by entities relating to a GSM and/or a UMTS type network, the proxy network 130 is a Long Term Evolution (or LTE) type network that uses, instead of an HLR, a Home Subscriber Server (or HSS) and, instead of a GMSC, a Mobility Management Entity (or MME) that carries out the functions performed by the proxy HLR 134 and the proxy GMSC 136 respectively as described supra.

The invention claimed is:

1. A method for accessing a roaming device,
the roaming device accessing a first subscription relating to a home network, the roaming device accessing a second subscription relating to an alternative roaming provider network, the method comprising the following steps:
    during a registration phase,
        the roaming device sends, through a visited network and a proxy network, to the home network an identifier relating to the first subscription, as a first subscription identifier;
        the home network sends, through the proxy network, to the visited network data relating to the first subscription;
        the proxy network sends to the home network a first temporary address relating to the proxy network;
        the visited network sends to the proxy network a second temporary address relating to the visited network;
        the roaming device de-activates the first subscription and activates only the second subscription;
        the roaming device sends, through the visited network and the proxy network, to the alternative roaming provider network an identifier relating to the second subscription, as a second subscription identifier;
        the alternative roaming provider network sends, through the proxy network, to the visited network data relating to the second subscription;
        the proxy network registers the first subscription identifier, the associated second subscription identifier, the associated first temporary address relating to the proxy network and the associated second temporary address relating to the visited network; and
        the proxy network sends to the alternative roaming provider network the first temporary address relating to the proxy network.

2. The method according to claim 1, wherein, the roaming device accesses a first authentication key for authenticating to the home network, the first authentication key being related to the first subscription, the roaming device authenticates successfully to the home network by using the first authentication key.

3. The method according to claim 1, wherein, the roaming device accesses a second authentication key for authenticating to the alternative roaming provider network, the second authentication key being related to the second subscription, the roaming device authenticates successfully to the alternative roaming provider network by using the second authentication key.

4. The method according to claim 1, wherein, the visited network comprises a visited Visitor Location Register or VLR type entity, the proxy network comprises a proxy Home Location Register or HLR type entity, the home network comprises a home HLR type entity, the alternative roaming provider network comprises an ARP HLR type entity, during the registration phase, the proxy HLR type entity communicates with the home HLR type entity, the visited VLR type entity and the ARP HLR type entity.

5. The method according to claim 1, wherein, the roaming device is identified, by the home network, by a home call number, the method further comprises the following steps:
    during a call establishment phase,
        a caller device initiates a call establishment, through the home network, with the roaming device, as a callee device, by using the home call number;
        the home network gets, based upon the home call number, the first temporary address relating to the proxy network;
        the home network sends to the proxy network the first temporary address relating to the proxy network;
        the proxy network gets, based upon the first temporary address relating to the proxy network, the second temporary address relating to the visited network;
        the proxy network sends to the visited network the second temporary address relating to the visited network;
        the visited network terminates successfully the call establishment with the callee device.

6. The method according to claim 5, wherein, each of the visited network, the home network and the proxy network comprises a Gateway Mobile Switching Center or GMSC type entity, during the call establishment phase, the proxy GMSC type entity communicates with a home GMSC type entity and a visited GMSC type entity.

7. The method according to claim 6, wherein the first temporary address relating to the proxy network includes a first Mobile Station Roaming Number or MSRN, the first MSRN comprising an address relating to the proxy GMSC type entity and the second temporary address relating to the visited network includes a second MSRN, the second MSRN comprising an address relating to the visited GMSC type entity.

8. The method according to claim 7, wherein the proxy network comprises a proxy HLR type entity, the proxy GMSC type entity receives from the home GSMC type entity the first MSRN, the proxy GMSC type entity sends to the proxy HLR type entity the first MSRN, the proxy HLR type entity gets, based upon the first MSRN, the second MSRN, the proxy HLR type entity sends to the proxy GMSC type entity the second MSRN and the proxy GMSC type entity sends to the visited GMSC type entity the second MSRN.

9. A proxy network for accessing a roaming device wherein during a registration phase, the proxy network is configured to:
    receive from the roaming device, through a visited network, an identifier relating to a first subscription, as a first subscription identifier;
    send to a home network the first subscription identifier;
    receive from the home network data relating to the first subscription;
    send to the visited network the data relating to the first subscription;
    send to the home network a first temporary address relating to the proxy network;
    receive from the visited network a second temporary address relating to the visited network;
    receive from the roaming device, through the visited network, an identifier relating to the second subscription, as a second subscription identifier;
    register the first subscription identifier, the associated second subscription identifier, the associated first temporary address relating to the proxy network and the associated second temporary address relating to the visited network;

send to the alternative roaming provider network the second subscription identifier;

receive from the alternative roaming provider network data relating to the second subscription;

send to the visited network the data relating to the second subscription; and send to the alternative roaming provider network the first temporary address relating to the proxy network.

10. The proxy network according to claim 9, wherein the proxy network includes a Mobile Network Portability type network.

* * * * *